No. 738,481. Patented September 8, 1903.

UNITED STATES PATENT OFFICE.

WILLIAM C. POPE, OF ST. LOUIS, MISSOURI.

EFFERVESCENT LAUNDRY BLUING.

SPECIFICATION forming part of Letters Patent No. 738,481, dated September 8, 1903.

Application filed February 21, 1903. Serial No. 144,507. (No specimens.)

*To all whom it may concern:*

Be it known that I, WILLIAM C. POPE, a citizen of the United States, residing at St. Louis, State of Missouri, have invented certain new and useful Improvements in Effervescent Laundry Bluing; and I do hereby declare the following to be a full, clear, and exact description of the invention, such as will enable others skilled in the art to which it appertains to make and use the same.

My invention consists in an effervescent coloring substance, preferably in form of a tablet, or granular, as an article of manufacture and in the method of making the same.

The substance consists, specifically, of a suitable blue and oxalic acid, with a soluble alkaline carbonate, such as bicarbonate of soda, and tartaric acid, or citric acid, or both.

I will describe one method of producing my improved effervescent bluing substance, which in practice I have found to be very satisfactory and give an example of one composition thereof. I prefer to form two separate mixtures, which are subsequently combined, preferably in equal parts. The first mixture is preferably composed of six pounds and two ounces of soluble blue (say Tieman's) and three pounds of oxalic acid. The second mixture preferably consists of thirteen pounds two ounces of bicarbonate of soda, four pounds eleven ounces of tartaric acid, and six pounds eleven ounces of citric acid, all of these ingredients being mixed well. I take equal parts of the two mixtures and after thoroughly commingling them granulate the mass and then preferably finally press the granules into tablets, each tablet weighing, say, six grains.

In order to granulate the mass as above described, it is placed in a pan, preferably over a water-bath, for the purpose of driving off the moisture from the acids, which moisture combines with the other ingredients to form a solid mass. This solid mass while hot is rubbed through sieves of the proper mesh to form particles of the proper size, said particles being afterward spread on trays and heated for the purpose of drying them. When dried, they are pressed into tablets, as described.

In giving the proportions as above stated I do not wish to be limited to the exact amounts set forth nor to the precise ingredients employed as the same may be changed without departing from the spirit of my invention, the point being within reason and as will be clear to those skilled in chemistry to proportion the alkaline matter and the acids in proper chemical relation to each other and not to have such excess of alkaline matter or of acid as would injure the blue, as by turning it green.

The effect of making a bluing or other coloring substance effervescent is to make the color automatically diffusive—that is to say, to cause the color by the substance itself to be distributed throughout the water or other liquid to be colored with rapidity and remarkable evenness without stirring or other mechanical operation, such as agitation—and the effervescence also causes the particles of color to be carried away from the substance or mass itself, whereby there will be no sediment or portion thereof left undissolved.

Having thus described my invention, what I claim as new, and desire to secure by Letters Patent, is—

1. As a new article of manufacture, an effervescent bluing compound containing matter to render the blue soluble, substantially as described.

2. As a new article of manufacture, a bluing substance comprising soluble bluing pigment and effervescent materials, substantially as described.

3. As a new article of manufacture, a bluing substance composed of soluble bluing pigment, oxalic acid, a suitable alkaline carbonate, and suitable acid, which, in solution, displacing the carbonic acid, will cause effervescence and a diffusion of the blue, substantially as described.

4. As a new article of manufacture, a bluing substance composed of soluble bluing pigment, oxalic acid, a suitable alkaline carbonate, tartaric acid, and citric acid, substantially as described.

5. As a new article of manufacture, granular laundry bluing composed of soluble bluing pigment and effervescent matter, substantially as described.

6. An effervescent mass in tablet form containing a soluble bluing-pigment, oxalic acid, and an alkaline material; substantially as described.

7. An effervescent coloring-tablet including tartaric acid, citric acid, oxalic acid, sodium bicarbonate, and soluble blue; substantially as described.

8. An effervescent coloring mass containing tartaric acid, oxalic acid, citric acid, an alkaline carbonate, and soluble blue; substantially as described.

9. An effervescent coloring-tablet including tartaric acid, oxalic acid, an alkaline carbonate, and soluble blue; substantially as described.

In testimony whereof I affix my signature in the presence of two subscribing witnesses.

WILLIAM C. POPE.

Witnesses:
R. G. DYRENFORTH,
E. T. BRANDENBURG.